United States Patent [19]
Götz

[11] Patent Number: 5,275,682
[45] Date of Patent: Jan. 4, 1994

[54] METHOD OF MAKING DECOR LAMINATE BOARD IN A SINGLE-LEVEL PLATEN PRESS

[75] Inventor: Wolfgang Götz, Krefeld-Fischeln, Fed. Rep. of Germany

[73] Assignee: G. Siempelkamp GmbH & Co., Krefeld, Fed. Rep. of Germany

[21] Appl. No.: 744,594

[22] Filed: Aug. 13, 1991

[30] Foreign Application Priority Data

Aug. 17, 1990 [DE] Fed. Rep. of Germany ....... 4026045

[51] Int. Cl.$^5$ .............................................. B32B 31/20
[52] U.S. Cl. .................................. 156/323; 156/220; 156/267; 156/289; 156/307.4
[58] Field of Search ................. 156/289, 323, 90, 219, 156/220, 307.4, 290, 222, 288

[56] References Cited

U.S. PATENT DOCUMENTS

| | | | |
|---|---|---|---|
| 2,742,388 | 4/1956 | Russell | 156/289 |
| 3,185,605 | 5/1965 | Osborne | 156/289 |
| 3,441,959 | 4/1969 | Sears | 156/288 |
| 3,700,537 | 10/1972 | Scher | 156/219 |
| 4,154,882 | 5/1979 | Ungar | 156/219 |
| 4,158,713 | 6/1979 | Degens | 156/289 |
| 4,208,231 | 6/1980 | Hoppe | 156/289 |
| 4,274,901 | 6/1981 | Elber | 156/290 |

FOREIGN PATENT DOCUMENTS 1911764 3/1969 Fed. Rep. of Germany.
2209901 3/1972 Fed. Rep. of Germany.

Primary Examiner—Michael W. Ball
Assistant Examiner—Daniel J. Stemmer
Attorney, Agent, or Firm—Herbert Dubno

[57] ABSTRACT

Two decor laminate boards are produced in a single-level platen press in each operation by forming a stack of the two laminates and a separating layer between them. The layer leaves at least portions of an edge region of the stack free so that the two boards as they are formed in the press are bonded together and can be removed from the press without relative shifting. The joined region is then trimmed off to free the boards from one another.

8 Claims, 3 Drawing Sheets

METHOD OF MAKING DECOR LAMINATE BOARD IN A SINGLE-LEVEL PLATEN PRESS

FIELD OF THE INVENTION

My present invention relates to a method of producing decor laminate board in a single platen press, i.e. the production of a laminate board having a structure, pattern of texture embossed on a face of the board during the pressing thereof. More particularly, the method relates to the simultaneous production of two such boards in a single press operation in a single-level platen press.

BACKGROUND OF THE INVENTION

Decor laminate board generally comprises a laminate containing or coated with a hardenable synthetic resin as will be described in greater detail hereinafter and is generally provided along a face of the board with embossing, texture or other structure imparted in the pressing operation.

The laminate can be inserted into a press in the open condition thereof between press platens which can be provided with embossing surfaces, the press can be closed to apply heat and pressure to the laminate, effect the embossing and cause hardening of the laminate into the board. The press is then opened and the board is removed. A charging device can insert the laminate into the press and a discharging device can remove the board from the press.

Two boards can be made simultaneously in the press by forming a stack of two such laminates having a separating layer to which the laminates are not adherent, between them. The separating layer can be sprayed or applied as a foil between the laminates. The two boards are thus formed on opposite sides of the separating layer and, upon removal from the press, can be destacked so that the stack is separated into its components, namely the two boards and the separating layer.

A laminate stack of this type has not, to the best of my knowledge, been used heretofore in conjunction with a single-level platen press. Rather such stacks are known for the production of decor laminate board in multilevel platen presses which have a number of press openings separated by respective platens and into each of which a respective stack can be introduced.

Multilevel platen presses operate in conjunction with press charging devices and press emptying devices or discharging devices of a type similar to those used with the multilevel presses for the production of particle board, fiber board and the like.

The laminates generally are assembled from intermediate layers of so-called kraft papers while the decor or patterned structure is applied to so called overlays which can overlie the kraft paper layers. The kraft paper layers may be synthetic resin impregnated special papers which can be assembled in a plurality of layers and covered by the overlay which can be a synthetic resin foil.

The laminate is subjected in the press to heat and pressure which, compacts the laminate, imparts a complementary structure of the embossing surface to the contacting face of the laminate and hardens the laminate into a board.

The fabrication of such pattern board in multilevel presses limits the ability for pattern changeover when, for example, frequent changeover is required for small lots of different structured boards. Rapid changeover of the embossing plates is economical only with single-level platen presses.

Both single-level platen presses and multilevel platen presses are cycled and thus can be collectively referred to as cycling presses. It is also known to produce decor laminate board with continuously operating presses, for example, steel belt presses in which the embossing pattern or structure must be provided on a steel belt. Replacement of such belts is time consuming and difficult and the use of these presses is not economical when small lots of the decor laminate board are desirable or when frequent changes of the embossing surfaces from lot to lot is required.

By contrast with multilevel presses, moreover, single-level presses operate in a short cycle process, a technology which is similar to that which has been developed for the laminating of decorative layers onto chip board, fiber board, or for the facing thereof.

Single-level presses require special charging devices like, for example, clamping bar systems (see German Patent Document DE 22 09 901) and emptying devices (see German Patent Document 19 11 764) operating, for example, with suction lifters. Such arrangements are not suitable for the simultaneous production of two decor laminate boards from two laminates in a single operation of a single-level platen press because problems arise in the pressing of such laminates when a separating layer is provided between them. These problems are associated with a tendency of the boards to shift relative to one another when the press is opened or as the press is opened, thereby making the removal of the boards difficult, if not impossible.

OBJECTS OF THE INVENTION

It is, therefore, the principal object of the invention to provide a method of making a decor laminate board whereby the drawbacks of earlier methods are avoided and a single-level platen press can be used.

A more specific object of the invention is to provide a method of making two such boards simultaneously in a single platen press in such manner that uncontrolled movements of the pressed boards relative to one another upon opening of the press do not affect fabrication operations.

It is also an object of my invention to provide an assembly which facilitates the production of pressed board.

SUMMARY OF THE INVENTION

This object is achieved, according to the invention by providing between the laminates a separating layer which leaves an edge region between the laminates free. In the press operation, therefore, in this edge region the laminate boards are fused together by bonding between the synthetic resin of the laminates, whereby, upon opening of the press, the boards are bonded together and form with the separating layer, a unique assembly which can be removed from the press as a unit without relative motion of the boards. Thereafter, the joined edge region is separated by a trimming operation, thereby separating the boards from one another and enabling the destacking thereof.

More particularly, the method of the invention can comprise the steps of:

(a) forming two laminates containing synthetic resin;

(b) assembling a stack by disposing a separating layer between the laminates so that the laminates are held apart by the separating layer over at least a central portion of the stack but are free to contact one another in at least one edge region of the stack;

(c) inserting the stack between two press platens of an open single-level platen press having embossing surfaces juxtaposed with opposite faces of the stack;

(d) closing the press, thereby compressing the stack between the surfaces, maintaining the press closed for a period of time sufficient to effect embossing of the opposite faces and hardening of the laminates into boards and bonding by the synthetic resin of the boards at the region;

(e) opening the press and removing the stack from the press, whereby the boards are held together against relative shifting by the bonding at the region; and (f) trimming the region from the stack, thereby separating the boards from one another.

The unique assembly of the invention is adapted to be hot pressed for making embossed laminate board. The assembly comprises two laminates containing synthetic resin, and a separating layer disposed between the laminates so that the laminates are held apart by the separating layer over at least a central portion of the stack but are free to contact one another in at least one edge region of the stack. The laminates are juxtaposed at the region so that, upon hotpressing of the assembly in a single-level platen press having embossing surfaces juxtaposed with opposite faces of the stack, the opposite faces are embossed and the laminates are hardened into boards and the boards are bonded by the synthetic resin of the boards at the region, whereby trimming of the region from the stack, separates the boards from one another.

The invention is based upon the joining of the boards formed from the two laminates at their edge regions and the discovery that such joining does not adversely affect the process in any respect, since the edge regions must be trimmed from the boards in any event. The unit formed by the joining boards can be removed from the press simply with the aid of conventional press discharging devices, e.g. that of German Patent Document DE 19 11 784. The trimming itself can be effected by conventional devices or apparatus such as standard trimming saws.

The joining of the two boards into an assembly allows them to be handled with suction devices and suction lifters and thus allows greater automation of the production of decor laminate boards. According to the invention, the separating layer can terminate short of the edges of the laminates so that the separating layer is geometrically similar to but smaller than the laminates and in the contacting edge region all around the separating layer, the boards can be bonded together. In plan view, therefore, the separating layer is smaller than that of the stack.

It is, however, also possible to provide a separating layer which is coextensive with the laminates but which is provided along its edges with openings through which the boards are bonded together.

BRIEF DESCRIPTION OF THE DRAWINGS

The above and other objects, features and advantages of my invention will become more readily apparent from the following description, reference being made to the accompanying highly diagrammatic drawing in which.

SPECIFIC DESCRIPTION

Figure 1:
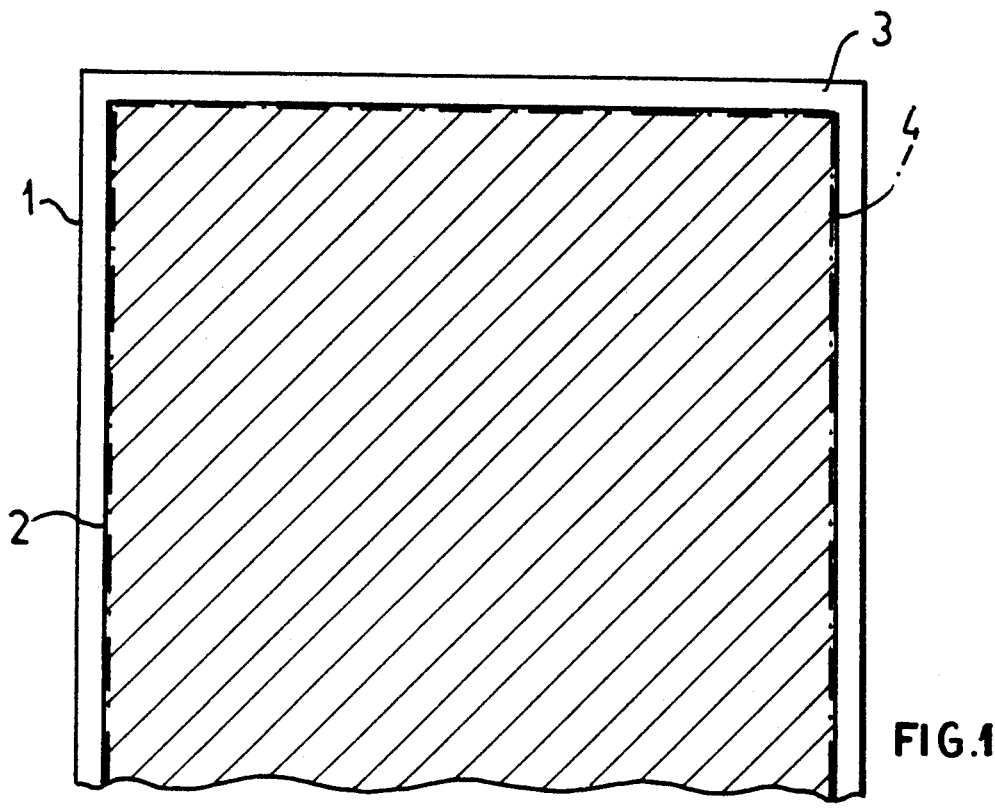
FIG. 1 is a fragmentary plan view, showing the separating layer hatched as if in section and illustrating the invention.
Figures 2, 3:
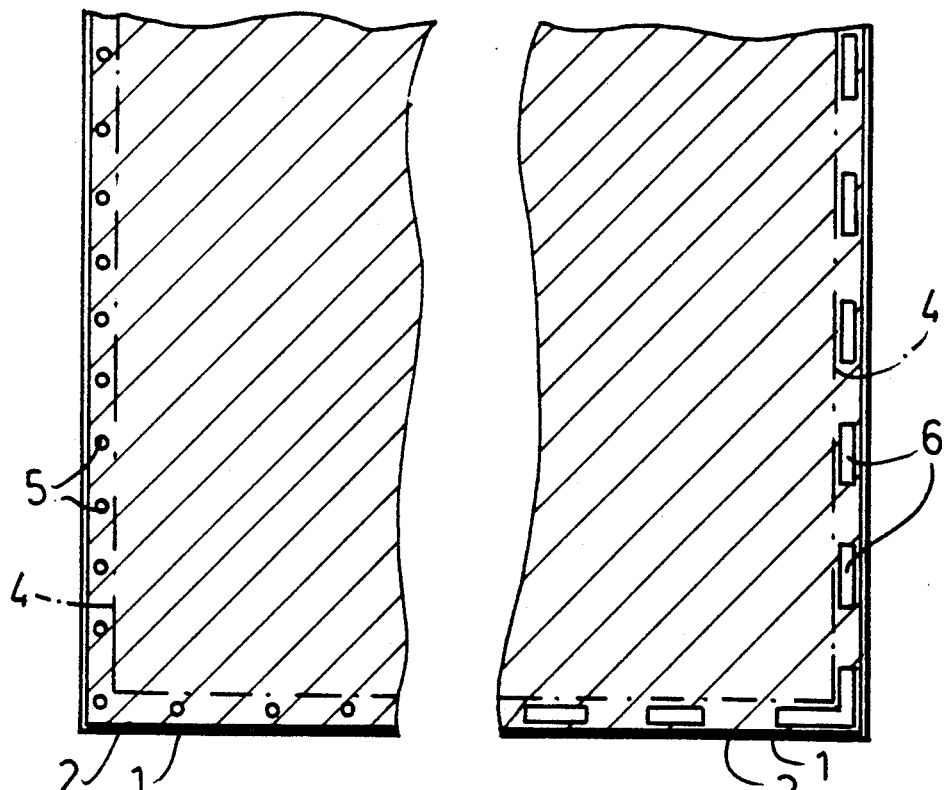
FIG. 2 is another fragmentary plan view showing another embodiment.
FIG. 3 is a third fragmentary plan view illustrating a third embodiment of the invention.

In all of FIGS. 1-3, the laminate stack is represented at 1 and has its laminates separated by a separating layer 2 to which the laminates and the hardened boards are not adherent.

In the embodiment of FIG. 1, edge regions 3 of the stack are free from the separating layer 2 so that the two laminates can be bonded together in this region and this region can be subsequently trimmed, e.g. along the dot-dash line 4, leaving the board and enabling the two boards to be separated from the separating layer. In the embodiment of FIG. 2 the separating layer 2 is substantially coextensive with the laminates but is formed in the edge region with holes 5 of circular cross section which are trimmed off when trimming is effected along the trim line 4. In the embodiment of FIG. 3, the holes 6 are elongated slots parallel to the respective edges of the separating layer 2 and the stack, through which the laminates are united and which lie in the edge region trimmed off by trimming along the trim line 4.

Figure 4:
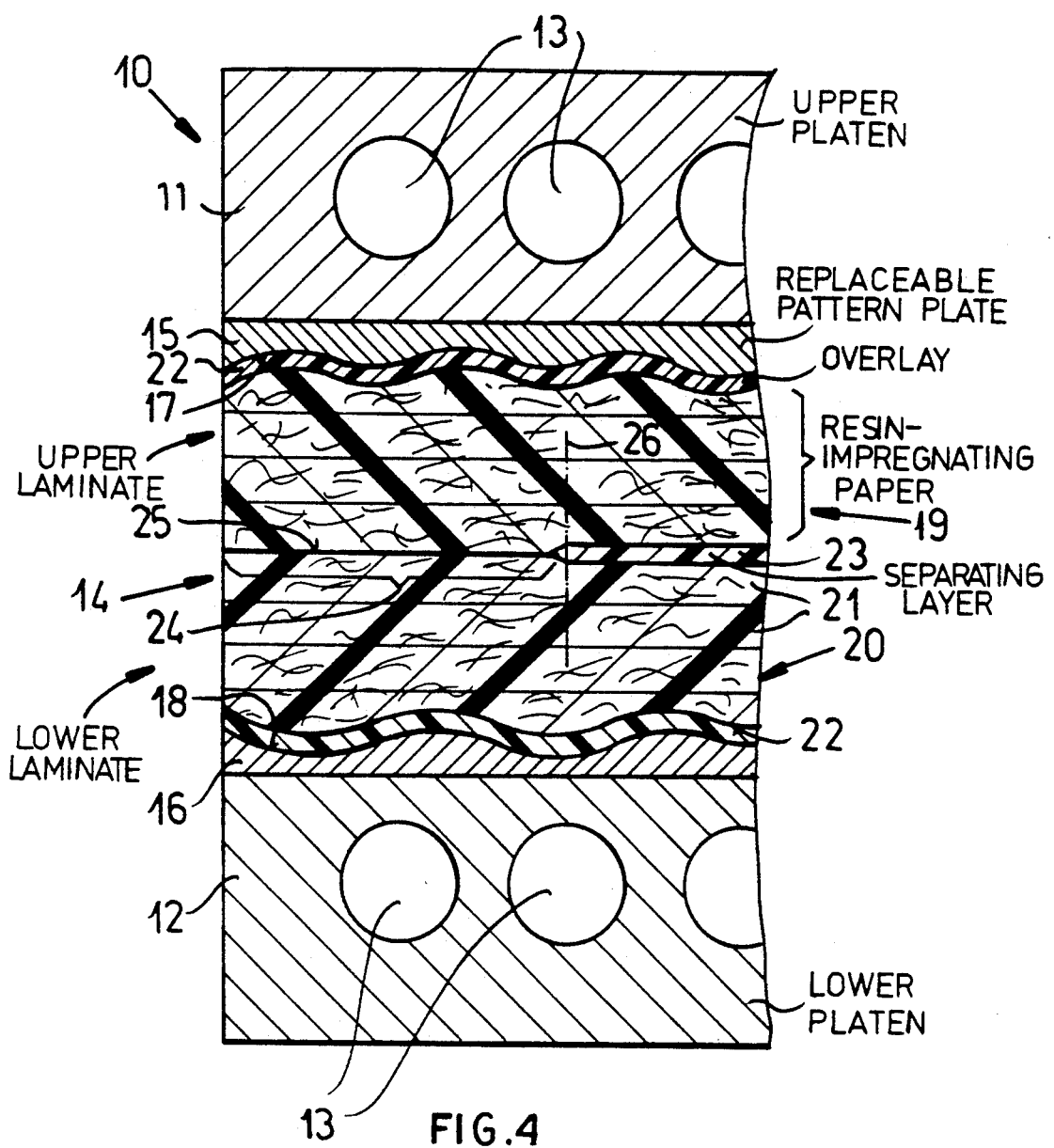
FIG. 4 is a section through a closed single-level press, greatly exaggerated with respect to the thickness of the board illustrating the principle of the invention as represented by the embodiment of FIG. 1.

As can be seen from FIG. 4, the single-level press 10 in which the boards are fabricated can comprise upper and lower platens 11 and 12, respectively, provided with means for opening and closing the press (not shown) and passages 13 in the platens through which superheated steam can be passed to provide the heat for the press.

At their sides confronting the stack 14, the platens 11 and 12 are formed with replaceable pattern plates 15 and 16 having a structure to be complementarily reproduced in the board and shown as undulations and corrugations 17 and 18 by way of example.

The stack 14 is formed from two laminates 19 and 20, each of which may comprise a number of layers 21 of synthetic resin impregnated kraft paper and an overlay 22 of synthetic resin or resin impregnated paper adapted to receive the embossing.

Figure 5:
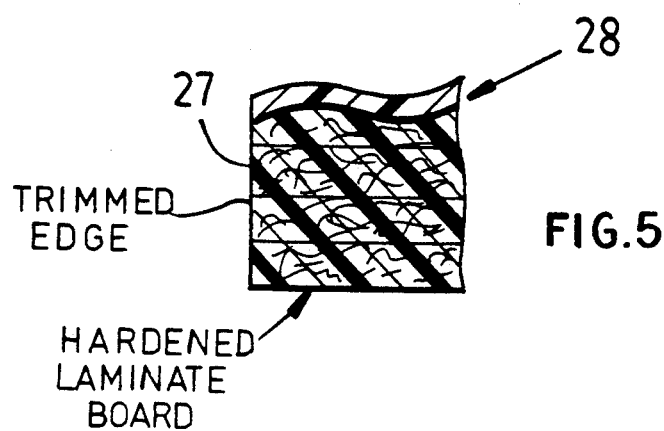
FIG. 5 is a section through a trimmed edge of a board as made utilizing the principles of FIGS. 1 and 4.

The stack has a separating layer 23 between the laminates, leaving an edge region 24 free so that, when the pressing is closed, the boards formed under heat and pressure are bonded together at 25 over this edge region. The stack 14 is thus unitary and slippage of the boards cannot occur when the press is opened. The stack or assembly 1 can thus be removed as a unit from the press and can be trimmed along a trimming line 26 (FIG. 4) to form the trimmed edge 27 (FIG. 5) in the finished board 28 so that the latter can be separated from the other elements of the stack, namely, the other board and the separating layer.

Figure 6:
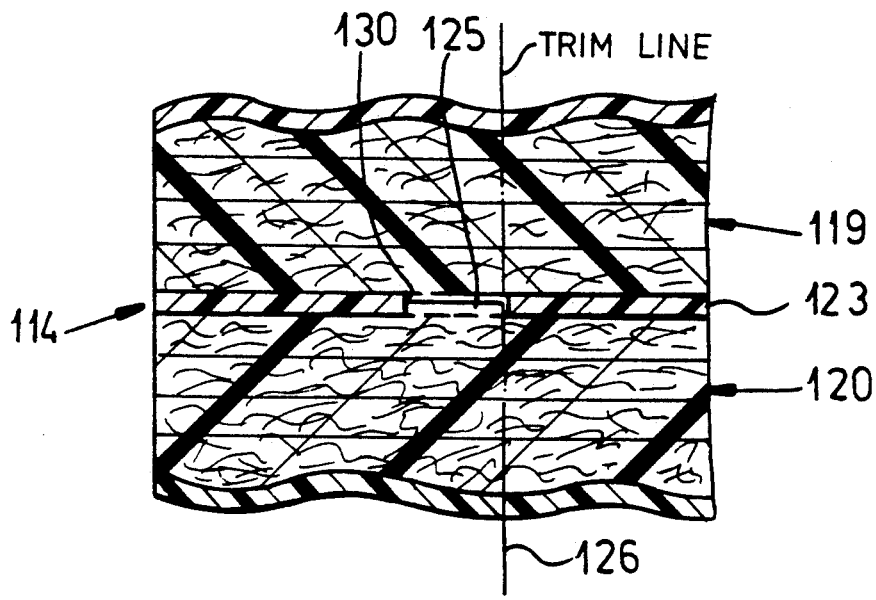
FIG. 6 is a section through the assembly made utilizing the principles of FIGS. 2 or 3 and a press otherwise identical to that of FIG. 4.
Figure 7:
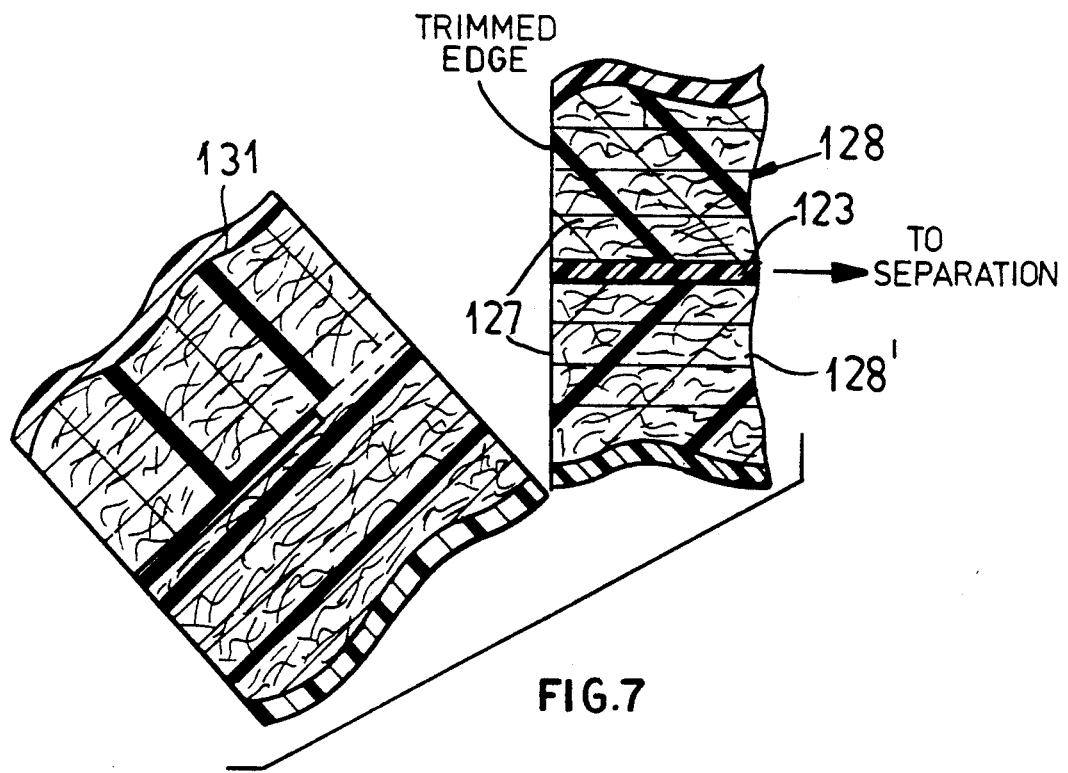
FIG. 7 is a diagrammatic sectional view illustrating the trimming step for the assembly of FIG. 6.

In the embodiment of FIG. 6, the unitary stack 114 is formed as described from two boards 119 and 120, except that the separating layer 123 has holes 130 therein within which the bond 125 is formed between the two boards. The trim line 126 here lies at the inner edge of the bores 130 so that, as can be seen from FIG. 7, the trimmed edges 127 are formed on the two boards 128 and 128' which can be separated from one another and the remaining portion of the separating layer 123'.

The waste 131, consisting of the connected parts of the boards and the remainder of the separating layer 123 can be discarded.

I claim:

1. A method of making embossed laminate board, comprising the steps of:
   (a) forming two laminates containing synthetic resin;
   (b) forming a separating layer and providing at least one edge of said separating layer with at least one opening;
   (c) assembling a stack by disposing said separating layer between said laminates so that said laminates are held apart by said separating layer over at least a central portion of said stack but are free to contact one another in at least one edge region of said stack including said opening;
   (d) inserting said stack between two press platens of an open single-level platen press having embossing surfaces juxtaposed with opposite faces of said stack;
   (e) closing said press, thereby compressing said stack between said surfaces, maintaining said press closed for a period of time sufficient to effect embossing of said opposite faces and hardening of said laminates into boards and bonding by said synthetic resin of said boards at said region through said opening without bonding of said boards to said separating layer;
   (f) opening said press and removing said stack from said press, whereby said boards are held together against relative shifting by the bonding at said region;
   (g) trimming said region from said stack, thereby separating said boards from one another; and
   (h) separating said separating layer from said boards.

2. The method defined in claim 1 wherein said separating layer terminates short of an edge of said stack.

3. The method defined in claim 2 wherein said separating layer has a configuration geometrically similar to that of said laminates but of smaller dimensions.

4. The method defined in claim 1 wherein said separating layer is substantially coextensive with said laminates.

5. The method defined in claim 4 wherein said separating layer is formed with a multiplicity of openings regularly spaced along said edge.

6. The method defined in claim 5 wherein said openings are provided along all of the edges of said separating layer.

7. The method defined in claim 6 wherein the openings formed in said separating layer are circular openings.

8. The method defined in claim 6 wherein the openings formed in said separating layer are rectangular openings parallel to the respective edge.

* * * * *